United States Patent
Sasaki et al.

(10) Patent No.: US 9,840,978 B2
(45) Date of Patent: Dec. 12, 2017

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Keisuke Sasaki, Susono (JP); Masakatsu Nagai, Hiratsuka (JP); Shigeyuki Urano, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/026,668

(22) PCT Filed: Sep. 26, 2014

(86) PCT No.: PCT/JP2014/076477
§ 371 (c)(1),
(2) Date: Apr. 1, 2016

(87) PCT Pub. No.: WO2015/050237
PCT Pub. Date: Apr. 9, 2015

(65) Prior Publication Data
US 2016/0245210 A1    Aug. 25, 2016

(30) Foreign Application Priority Data
Oct. 4, 2013   (JP) ................. 2013-209533

(51) Int. Cl.
*F02D 41/22* (2006.01)
*F02D 35/02* (2006.01)
*G01L 27/00* (2006.01)
*G01L 23/22* (2006.01)

(52) U.S. Cl.
CPC ......... *F02D 41/222* (2013.01); *F02D 35/023* (2013.01); *G01L 23/225* (2013.01); *G01L 27/007* (2013.01); *Y02T 10/40* (2013.01)

(58) Field of Classification Search
CPC ..................................................... F02D 41/222
See application file for complete search history.

(56) References Cited

U.S. PATENT DOCUMENTS 7,367,319 B2 *   5/2008   Kuo ................... F02B 23/0672
                                                        123/305
7,637,251 B2 *  12/2009   Kuo ................... F02B 23/0672
                                                        123/305

FOREIGN PATENT DOCUMENTS

| GB | 2490936 A    | 11/2012 |
|----|--------------|---------|
| JP | H08-218933 A | 8/1996  |
| JP | 2010-071197 A | 4/2010 |
| JP | 2012-225303 A | 11/2012 |

(Continued)

*Primary Examiner* — Adam Tissot
*Assistant Examiner* — Michael Berns
(74) *Attorney, Agent, or Firm* — Andrews Kurth Kenyon LLP

(57) ABSTRACT

A control device for an internal combustion engine is provided that can detect the adherence of deposits to a cylinder pressure sensor without subjecting the internal combustion engine to an impact or the like. A control device for an internal combustion engine equipped with a cylinder pressure sensor detects changes in the sensitivity of the cylinder pressure sensor. If the control device detects a decrease in the sensitivity of the cylinder pressure sensor after detecting an increase in the sensitivity of the cylinder pressure sensor, the control device determines that deposits are adhered to the cylinder pressure sensor.

6 Claims, 8 Drawing Sheets

(56) References Cited

FOREIGN PATENT DOCUMENTS

| JP | 2013-044258 A | 3/2013 |
|----|---------------|--------|
| WO | 2013/084309 A1 | 6/2013 |

* cited by examiner

CONTROL DEVICE FOR INTERNAL COMBUSTION ENGINE

CROSS-REFERENCE TO RELATED APPLICATIONS

This is a national phase application based on the PCT International Patent Application No. PCT/JP2014/076477 filed Sep. 26, 2014, claiming priority to Japanese Patent Application No. 2013-209533 filed Oct. 4, 2013, the entire contents of both of which are incorporated herein by reference.

FIELD OF THE INVENTION

The present invention relates to a control device for an internal combustion engine, and more particularly to a control device for an internal combustion engine equipped with a function that determines the adherence of deposits to a cylinder pressure sensor.

BACKGROUND ART

Technology is already known that, in a case where a cylinder pressure sensor provided in an internal combustion engine is causing a sensitivity decrease, determines whether the sensitivity decrease is due to a failure of the cylinder pressure sensor or is due to the adherence of deposits to the cylinder pressure sensor. For example, in Japanese Patent Laid-Open No. 2013-044258, technology is disclosed that determines the adherence of deposits based on the number of occurrences of pre-ignition. The aforementioned technology employs a technique that measures the number of occurrences of pre-ignition within a fixed period after pre-ignition has been intentionally caused to occur, and compares the number of occurrences with a previously set determination frequency. The reason the number of occurrences of pre-ignition is used as an index for determining adherence of deposits is described hereunder.

Once pre-ignition occurs in an internal combustion engine, deposits that are detached by the impact generated by the pre-ignition serve as ignition sources, and pre-ignition occurs in a chain-like manner. Therefore, if there are a large number of occurrences of pre-ignition within a fixed period, it can be said that deposits of an amount corresponding thereto are adhered.

CITATION LIST

Patent Literature

[Patent Literature 1]
Japanese Patent Laid-Open No. 2013-044258
[Patent Literature 2]
Japanese Patent Laid-Open No. 2012-225303
[Patent Literature 3]
Japanese Patent Laid-Open No. 8-218933

SUMMARY OF THE INVENTION

However, according to the above described technology, there is a possibility that the internal combustion engine will be affected by the impact generated by pre-ignition and the like.

The present invention has been conceived to solve the above described problem, and an object of the present invention is to provide a control device for an internal combustion engine that can detect the adherence of deposits to a cylinder pressure sensor without subjecting the internal combustion engine to an impact or the like.

To achieve the above described object, a first invention is a control device for an internal combustion engine equipped with a cylinder pressure sensor, the control device including:
detection means for detecting a change in a sensitivity of the cylinder pressure sensor; and
deposit adherence determination means for determining that deposits are adhered to the cylinder pressure sensor in a case where a decrease in the sensitivity of the cylinder pressure sensor is detected after an increase in the sensitivity of the cylinder pressure sensor is detected.

A second invention is in accordance with the first invention, the control device further including:
sensitivity change rate calculation means for calculating a rate of change relative to an initial state of the sensitivity of the cylinder pressure sensor; and
deposit property determination means for determining that adhered deposits are soft in a case where the rate of change at a time point at which the change in the sensitivity of the cylinder pressure sensor switches from a sensitivity increase to a sensitivity decrease is greater than a first reference value, and determining that adhered deposits are hard in a case where the rate of change at a time point at which the change in the sensitivity of the cylinder pressure sensor switches from a sensitivity increase to a sensitivity decrease is less than a second reference value that is less than the first reference value.

A third invention is in accordance with the first or second invention, the control device further including deposit adherence pace determination means for determining that a pace of adherence of deposits is abnormal in a case where a time period from a time point at which the change in the sensitivity of the cylinder pressure sensor starts to be a sensitivity increase until a time point at which the change in the sensitivity of the cylinder pressure sensor switches from the sensitivity increase to a sensitivity decrease is shorter than a reference time period.

A fourth invention is in accordance with any one of the first to third inventions, the control device further including deposit detachment means for executing control that detaches deposits in a case where the control device determines that deposits are adhered.

According to the first invention, it can be determined that a decrease in the sensitivity of a cylinder pressure sensor is due to the adherence of deposits.

According to the second invention, the properties of adhered deposits can be determined. It is therefore possible to estimate the cause for the occurrence of the adhered deposits.

According to the third invention, the pace of adherence of deposits can be determined.

According to the fourth invention, appropriate measures can be adopted with respect to a cylinder pressure sensor to which deposits are adhered.

DESCRIPTION OF EMBODIMENTS

First Embodiment

System Configuration of First Embodiment

Figure 1:
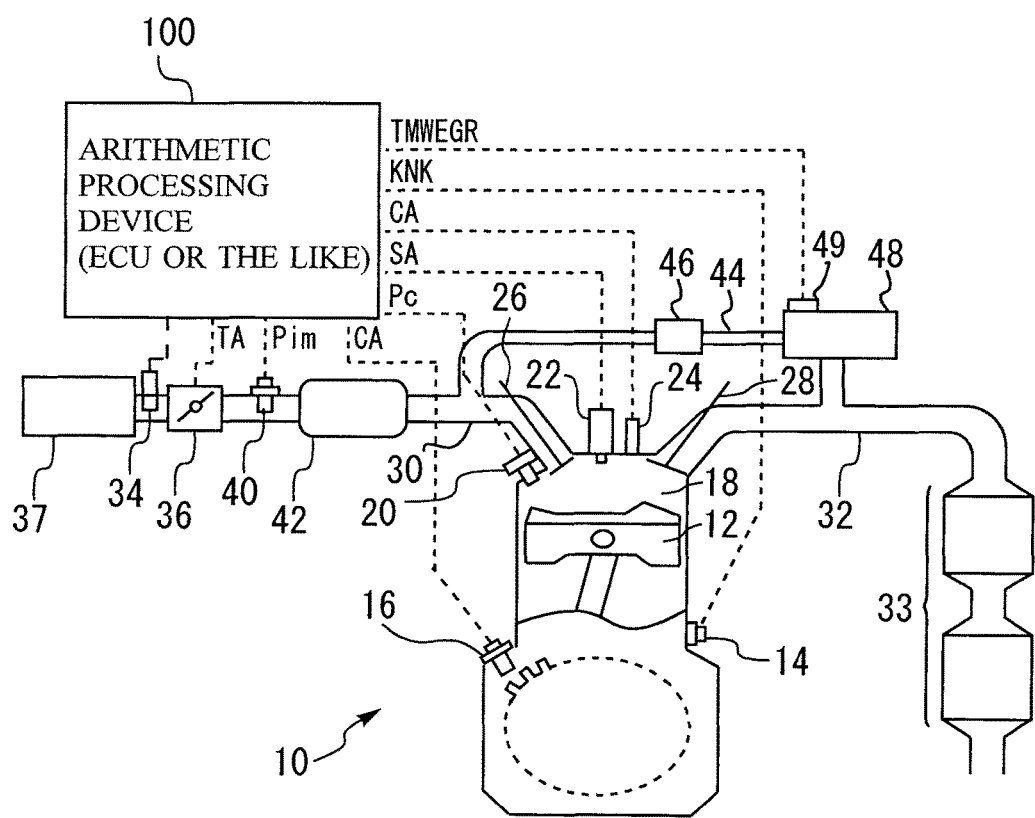
FIG. 1 is a schematic configuration diagram for describing the configuration of a system of a first embodiment of the present invention.

FIG. 1 is a schematic configuration diagram for describing the configuration of a system of a first embodiment of the present invention. The system shown in FIG. 1 includes an engine 10. Although normally the engine 10 includes a plurality of cylinders, only one cylinder is depicted in FIG. 1. In the present invention, the number of cylinders and the cylinder arrangement is not limited to the configuration illustrated in FIG. 1.

A piston 12 is provided in the engine 10. The piston 12 is connected to a crankshaft (not shown). A crank angle sensor 16 is provided in the vicinity of the crankshaft. Further, a knock sensor 14 for detecting knocking is provided in the vicinity of a combustion chamber 18 of the engine 10.

A cylinder pressure sensor 20 (hereunder, also referred to as "CPS") is attached to the combustion chamber 18 of the engine 10. The cylinder pressure sensor 20 includes a detection portion that has a piezoelectric element or the like. The detection portion is disposed in a state in which the detection portion faces the inside of the combustion chamber 18. A spark plug 22 and a fuel injection valve 24 are attached to the combustion chamber 18. Note that the position of the fuel injection valve 24 is not limited thereto. For example, the fuel injection valve 24 may be attached to an intake port. Further, a configuration may be adopted in which the fuel injection valve 24 is attached to both of the combustion chamber 18 and the intake port.

The engine 10 includes an intake passage 30 through which air is drawn into the combustion chamber 18. An intake valve 26 is provided at a connecting portion between the combustion chamber 18 and the intake passage 30.

A surge tank 42, a throttle valve 36, and an air cleaner 37 are provided in that order in the upstream direction from the intake valve 26 in the intake passage 30. Air flows into the intake passage 30 from the air cleaner 37 side and passes through the throttle valve 36 and is guided to the surge tank 42. The air that is guided to the surge tank 42 flows into the combustion chamber 18 when the intake valve 26 is opened. In addition, an intake pipe pressure sensor 40 is provided in the intake passage 30 between the surge tank 42 and the throttle valve 36. An air flow sensor 34 is provided in the intake passage 30 between the throttle valve 36 and the air cleaner 37.

The engine 10 includes an exhaust passage 32 through which gas generated in the combustion chamber 18 is discharged. An exhaust valve 28 is provided at a connecting portion between the combustion chamber 18 and the exhaust passage 32.

A catalyst 33 for purifying gas discharged from the combustion chamber 18 is provided downstream of the exhaust passage 32.

In order to perform exhaust gas recirculation (hereunder, referred to as "EGR"), an EGR passage 44 that communicates between the exhaust passage 32 and the intake passage 30 is provided in the engine 10. An EGR cooler 48 and an EGR valve 46 are provided in that order in the direction of the intake passage 30 from the exhaust passage 32 in the EGR passage 44. A temperature sensor 49 is provided in the EGR cooler 48.

The configuration of the system of the first embodiment includes an ECU (engine control unit) 100 that controls the operating state of the engine 10. Various sensors such as the knock sensor 14, the crank angle sensor 16, the cylinder pressure sensor 20, the air flow sensor 34, the intake pipe pressure sensor 40 and the temperature sensor 49 are respectively connected to an input side of the ECU 100. These various sensors detect information for controlling the engine 10, and output the detected information as signals to the ECU 100. More specifically, the knock sensor 14 outputs a signal that is in accordance with an impact that occurs in the combustion chamber 18. The crank angle sensor 16 outputs a pulse signal that is synchronized with rotation of the crankshaft. The cylinder pressure sensor 20 outputs a signal that is in accordance with a cylinder pressure generated by combustion in the combustion chamber 18. The air flow sensor 34 outputs a signal that is in accordance with an intake air amount. The intake pipe pressure sensor 40 outputs a signal that is in accordance with an intake pipe pressure.

The ECU 100 detects the operating state of the engine 10 based on the signals that are output by the various sensors described above. More specifically, the ECU 100 detects knocking in the combustion chamber 18 based on the output of the knock sensor 14. The ECU 100 detects a crank angle (CA) based on a constant pulse signal that the crank angle sensor 16 outputs. The ECU 100 detects the cylinder pressure based on the signal that the cylinder pressure sensor 20 outputs. The ECU 100 then detects a change in the cylinder pressure during a combustion cycle based on the crank angle and the cylinder pressure. The ECU 100 calculates an intake air amount based on the signal that the air flow sensor 34 outputs. The ECU 100 detects an intake pipe pressure based on the signal that the intake pipe pressure sensor 40 outputs. The ECU 100 calculates the temperature of cooling water inside the EGR cooler 48 based on the output of the temperature sensor 49.

On the other hand, actuators such as the spark plug 22, the fuel injection valve 24, the throttle valve 36, and the EGR valve 46 are respectively connected to an output side of the ECU 100. The ECU 100 determines the ignition timing by supplying a drive signal to the spark plug 22. The ECU 100 determines the fuel injection amount by supplying drive signals to regulate the timings for opening and closing of the fuel injection valve 24. The ECU 100 regulates an air amount that is supplied to the combustion chamber 18 by adjusting the degree of opening of the throttle valve 36. The ECU 100 regulates an EGR amount by adjusting the degree of opening of the EGR valve 46.

[Decrease in Sensitivity of Cylinder Pressure Sensor 20]

Figure 2:
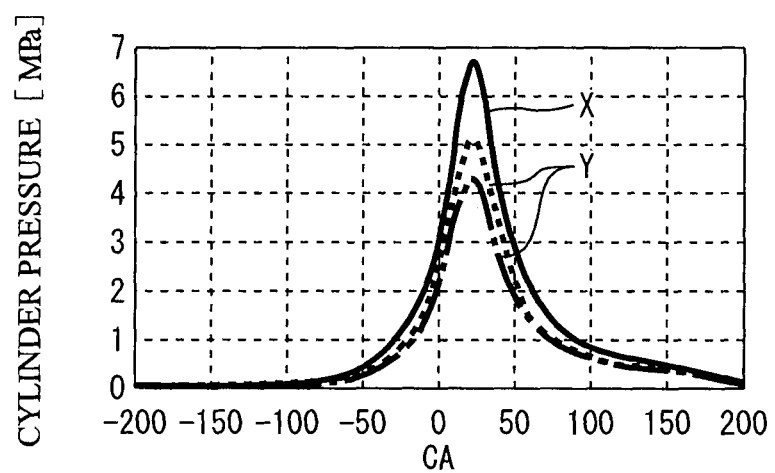
FIG. 2 is a view illustrating changes in a cylinder pressure that are detected during one combustion cycle according to the first embodiment.

FIG. 2 is a view that illustrates changes in the cylinder pressure that are detected during one combustion cycle according to the first embodiment. A solid line denoted by reference character X in FIG. 2 represents an output value of the cylinder pressure sensor 20 at a normal time. In contrast, a dashed line and an alternate long and short dash line that are denoted by reference character Y in FIG. 2 represent an output value of the cylinder pressure sensor 20 at a time of a sensitivity decrease. As shown in FIG. 2, the lines denoted by reference character Y represent a lower cylinder pressure relative to the line denoted by reference character X. When the output value of the cylinder pressure sensor 20 is low compared to a normal time as in the case represented by Y in FIG. 2, it means that an abnormality of some kind has occurred in the cylinder pressure sensor 20 and the sensitivity has decreased.

However, the cause of the sensitivity decrease cannot be distinguished based on only the above described decrease in the output value of the cylinder pressure sensor 20, that is, it is not possible to distinguish whether the sensitivity decrease is due to a failure of the cylinder pressure sensor 20 itself, for example, the effect of a disconnected wire or the like, or whether the sensitivity decrease is due to the adherence of deposits to the detection portion of the cylinder pressure sensor 20. If the cause of the abnormality cannot be distinguished, the appropriate measures cannot be taken with respect to the cylinder pressure sensor 20 that is causing the sensitivity decrease.

Therefore, according to the first embodiment, attention is focused on a characteristic sensitivity change that indicates that deposits are adhered to the cylinder pressure sensor 20, and it is determined that deposits are adhered to the cylinder pressure sensor 20 in a case where the sensitivity change in question has occurred. It is thereby possible to determine the adherence of deposits to the cylinder pressure sensor 20. Hereunder, this determination of the adherence of deposits is described in detail.

[Adherence of Deposits to Detection Portion of Cylinder Pressure Sensor 20]

Figure 3A:
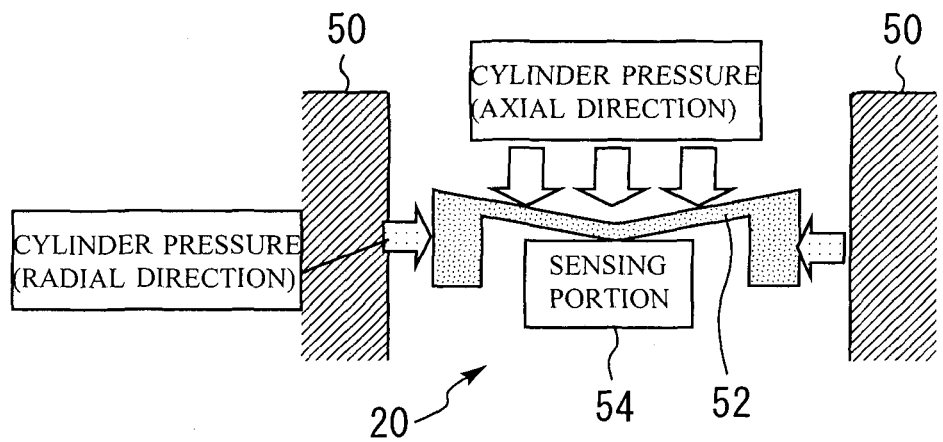
FIGS. 3A and B are views that illustrate, in an enlarged manner, a detection portion of the cylinder pressure sensor at a normal time according to the first embodiment.

First, states that the cylinder pressure sensor 20 enters as the result of deposits adhering to the detection portion of the cylinder pressure sensor 20 will be described using FIGS. 3A and B and FIGS. 4A and B. FIGS. 3A and B are views that illustrate, in an enlarged manner, the detection portion of the cylinder pressure sensor 20 at a normal time according to the first embodiment. An engine head 50 is shown in FIG. 3A. A pressure-receiving portion 52 and a sensing portion 54 that constitute the detection portion of the cylinder pressure sensor 20 are illustrated within the engine head 50. As shown in FIG. 3A, normally the pressure-receiving portion 52 is subjected to cylinder pressure from an axial direction and is subjected to cylinder pressure from a radial direction.

Figure 3B:
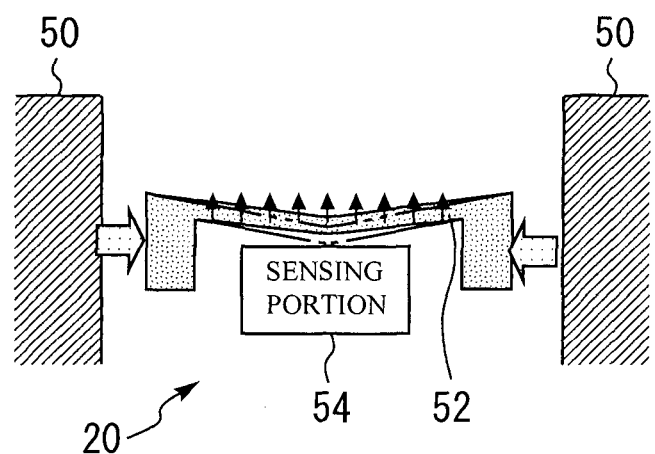

FIG. 3B is a view that illustrates, in an enlarged manner, the detection portion of the cylinder pressure sensor 20 at a normal time according to the first embodiment. In the pressure-receiving portion 52 shown in FIG. 3B, a distortion is arising that is caused by cylinder pressure from the radial direction. Because of this distortion of the pressure-receiving portion 52, a force that attempts to separate the pressure-receiving portion 52 from the sensing portion 54 arises with respect to the pressure-receiving portion 52. As a result, the pressure that the sensing portion 54 receives from the pressure-receiving portion 52 is reduced, and the output of the cylinder pressure sensor 20 decreases. Therefore, when the cylinder pressure sensor 20 is operating normally, the state is one in which the sensitivity is slightly decreased.

Figure 4A:
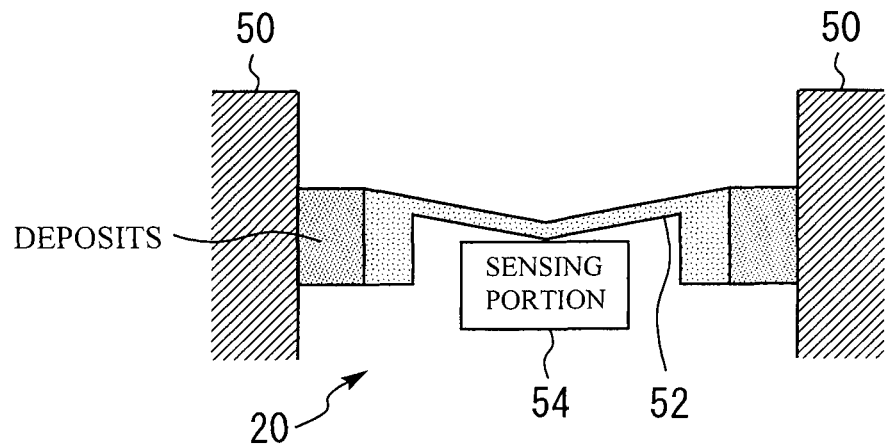
FIGS. 4A and B are views that illustrate a state in which deposits are adhered to the detection portion of the cylinder pressure sensor according to the first embodiment.

FIGS. 4A and B are views that illustrate states in which deposits are adhered to the detection portion of the cylinder pressure sensor 20 according to the present embodiment. FIG. 4A illustrates a state in which deposits are adhered to side faces of the pressure-receiving portion 52. In this state, the pressure-receiving portion 52 can no longer receive a cylinder pressure from the side faces, that is, a cylinder pressure from the radial direction. Consequently, the distortion described in FIG. 3B disappears. As a result, the decrease in the sensitivity that existed before deposits adhered to the side faces disappears, and the sensitivity increases in comparison to a normal time.

Figure 4B:
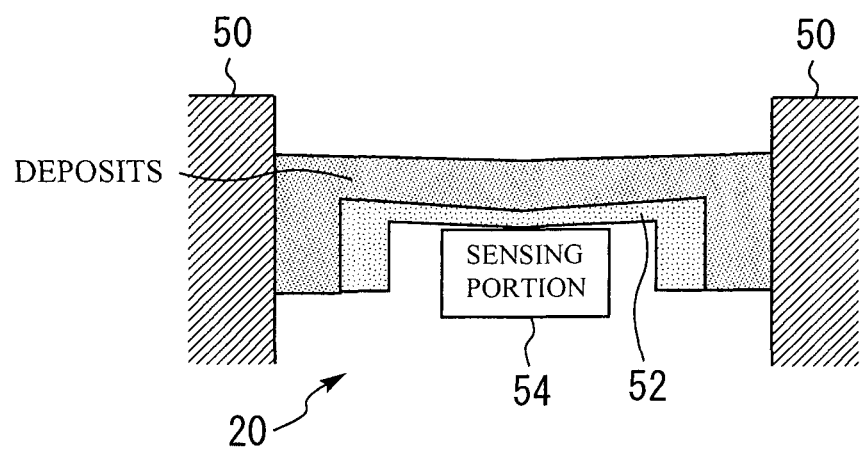

FIG. 4B illustrates a state in which deposits are also adhered to the upper face of the pressure-receiving portion 52. In this state, a change in the pressure-receiving portion 52 is inhibited by the adhered deposits on the upper face of the pressure-receiving portion 52. As a result, the sensitivity of the cylinder pressure sensor 20 decreases.

Adherence of deposits to the cylinder pressure sensor 20 begins from the back part of the detection portion of the cylinder pressure sensor 20, in other words, from the side faces of the pressure-receiving portion 52. That is, adherence of deposits to the cylinder pressure sensor 20 proceeds from the state shown in FIG. 4A to the state shown in FIG. 4B. Therefore, at the initial stage of deposit adherence, a sensitivity increase is the dominant change with respect to a change in the sensitivity of the cylinder pressure sensor 20 as the result of the adherence of deposits to the side faces of the pressure-receiving portion 52. Thereafter, as deposits adhere to the upper face of the pressure-receiving portion 52, a sensitivity decrease becomes the dominant change with respect to a change in the sensitivity of the cylinder pressure sensor 20. Accordingly, when deposits adhere to the cylinder pressure sensor 20, the changes in the sensitivity of the cylinder pressure sensor 20 are firstly a sensitivity increase and thereafter a sensitivity decrease.

[Sensitivity Change Rate of Cylinder Pressure Sensor 20]

Figure 5:
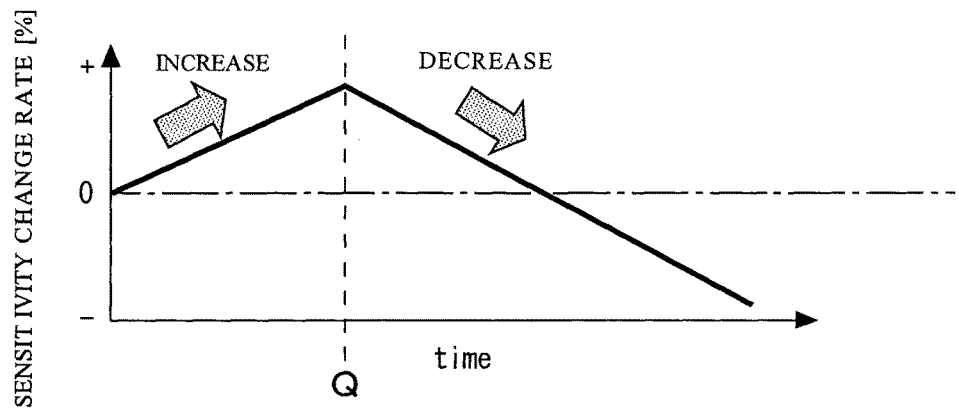
FIG. 5 is a view in which the kinds of sensitivity changes caused by the cylinder pressure sensor due to the adherence of deposits are represented with respect to the passage of time according to the first embodiment.

FIG. 5 is a view in which the kinds of sensitivity changes caused by the cylinder pressure sensor 20 due to the adherence of deposits are represented with respect to the passage of time according to the first embodiment. The vertical axis in FIG. 5 represents a sensitivity change rate. The horizontal axis in FIG. 5 represents passage of time. The sensitivity change rate will now be described.

The term "sensitivity change rate" refers to a value that represents, as a percentage, the degree to which the current output sensitivity of the cylinder pressure sensor 20 has risen or fallen in comparison to an initial state. Here, the term "output sensitivity" refers to a ratio between a difference between cylinder pressures at two points during a compression stroke and an intake air amount. Further, available methods for calculating the output sensitivity include methods which utilize the cylinder pressure when motoring to calculate the output sensitivity, such as a method that calculates the output sensitivity by comparing an output peak value before ignition and a maximum cylinder pressure of a pre-stored motoring waveform. Further, the term "initial state" refers to, for example, the output sensitivity of the cylinder pressure sensor 20 when the cylinder pressure sensor 20 is first mounted in the engine 10, or the output sensitivity of the cylinder pressure sensor 20 when the cylinder pressure sensor 20 is mounted in the engine 10 after maintenance. More specifically, the state of the cylinder pressure sensor 20 shown in FIG. 3B is the initial state, and is a state in which the sensitivity change rate is 0%. Next, sensitivity change rate calculation means for calculating a sensitivity change rate that is included in the ECU 100 according to the first embodiment will be described.

The ECU 100 calculates the sensitivity change rate by comparing the detected output sensitivity and the initial state. In addition, the ECU 100 sequentially stores the sensitivity change rates from the time point of the initial state. As a result, the ECU 100 can ascertain the manner in which the sensitivity of the cylinder pressure sensor 20 changes from the time point of the initial state. With regard to the timing at which the ECU 100 stores the sensitivity change rate, for example, the ECU 100 can store the sensitivity change rate at each combustion cycle.

In the sensitivity change rate represented by a solid line in FIG. 5, the sensitivity increases from the initial state, and thereafter the sensitivity decreases, with a time point Q serving as a point at which the sensitivity starts to decrease. The increase in the sensitivity change rate is due to the adherence of deposits to the side faces of the pressure-receiving portion 52 as described above using FIG. 4A. The decrease in the sensitivity change rate is due to the adherence of deposits to the upper face of the pressure-receiving portion 52 as described above using FIG. 4B. Thus, by obtaining the sensitivity change rate over the passage of time, it is possible to ascertain a time point at which a change in the sensitivity of the cylinder pressure sensor 20 switches from a sensitivity increase to a sensitivity decrease.

The switch from a sensitivity increase to a sensitivity decrease with respect to the cylinder pressure sensor 20 that has been described above using FIG. 5 is a characteristic sensitivity change that is exhibited in a case where deposits have adhered to the cylinder pressure sensor 20. It can be determined that deposits are adhering to the cylinder pressure sensor 20 by detecting this characteristic sensitivity change.

[Deposit Adherence Determination Routine]

Figure 6:
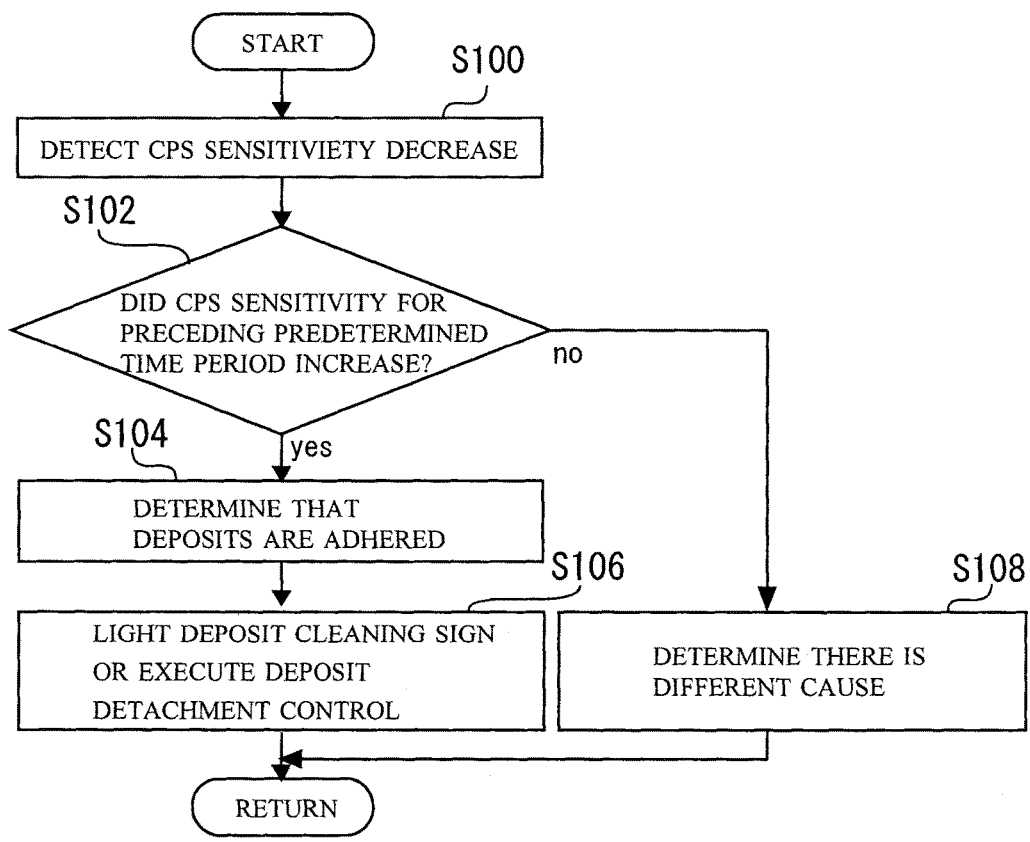
FIG. 6 is a flowchart of a deposit adherence determination routine executed by an ECU in the first embodiment.

FIG. 6 is a flowchart of a deposit adherence determination routine executed by the ECU 100 in the first embodiment. The ECU 100 has a memory for storing the present routine. The ECU 100 has a processor for executing the present routine that is stored.

In the present routine, first the ECU 100 detects a decrease in the sensitivity of the cylinder pressure sensor 20 (described as "CPS sensitivity decrease" in the flowchart in FIG. 6) (S100). If the current sensitivity change rate is lower than the immediately preceding sensitivity change rate, the ECU 100 determines that the sensitivity of the cylinder pressure sensor 20 decreased.

Next, the ECU 100 determines whether or not the sensitivity of the cylinder pressure sensor 20 had been increasing (S102) for a preceding predetermined time period. If the sensitivity change rate prior to the immediately preceding sensitivity change rate had continued to increased, the ECU 100 determines that the sensitivity of the cylinder pressure sensor 20 had been increasing. For example, in a case where the ECU 100 had stored the sensitivity change rate for each combustion cycle, the ECU 100 determines whether or not there was a continuous increase in the sensitivity change rate for a preceding number of combustion cycles, for example, from five combustion cycles prior to the current combustion cycle until one combustion cycle prior to the current combustion cycle. By executing S102 the ECU 100 can ascertain the time point at which the change in sensitivity of the cylinder pressure sensor 20 switched from a sensitivity increase to a sensitivity decrease. By ascertaining the time point of such a switch, the ECU 100 can determine that the cause of the decrease in sensitivity of the cylinder pressure sensor 20 is the adherence of deposits.

Next, if it is determined in S102 that the sensitivity of the cylinder pressure sensor 20 had been increased for a preceding predetermined time period, the ECU 100 determines that deposits are adhered to the cylinder pressure sensor 20 (S104).

Next, the ECU 100 lights a deposit cleaning sign or executes deposit detachment control (S106). Thereafter, the present routine is repeated. Examples of the deposit detachment control includes control that increases the combustion temperature to burn off deposits, or control that intentionally generates pre-ignition or knocking to detach deposits by means of an impact. Further, by lighting the deposit cleaning sign, the ECU 100 can notify the user of the vehicle and a maintenance worker of the fact that deposits are adhered, and thereby prompt the user and maintenance worker to use a deposit cleaner or the like.

On the other hand, if the ECU 100 determines in S102 that the sensitivity of the cylinder pressure sensor 20 had not been increasing for a preceding predetermined time period, the ECU 100 determines that the decrease in the sensitivity of the cylinder pressure sensor 20 is due to another cause (S108). A case in which the cylinder pressure sensor 20 malfunctions due to a disconnected wire or the like may be mentioned as one example of a cause that is other than the adherence of deposits. Thereafter, the present routine is repeated.

As described in detail above, according to the first embodiment, when a decrease in the sensitivity of the cylinder pressure sensor 20 is detected after an increase in the sensitivity of the cylinder pressure sensor 20 had been detected, it can be ascertained that deposits are adhered to the cylinder pressure sensor 20. In addition, since a time point at which a change in the sensitivity switched from a sensitivity increase to a sensitivity decrease is taken as the determination criterion, appropriate measures can be taken before a large amount of deposits adhere to the upper face of the pressure-receiving portion 52 and the sensitivity becomes less than or equal to the initial state. As a result, the adherence of deposits to the cylinder pressure sensor 20 can be suppressed to a minimum.

Note that, "detection means" according to the first invention is realized by the ECU 100 executing the above described S100, "deposit adherence determination means" according to the first invention is realized by the ECU 100 executing the above described S102, S104, and S108, and "deposit detachment means" according to the fourth invention is realized by the ECU 100 executing the above described S106.

Second Embodiment

Figure 7:
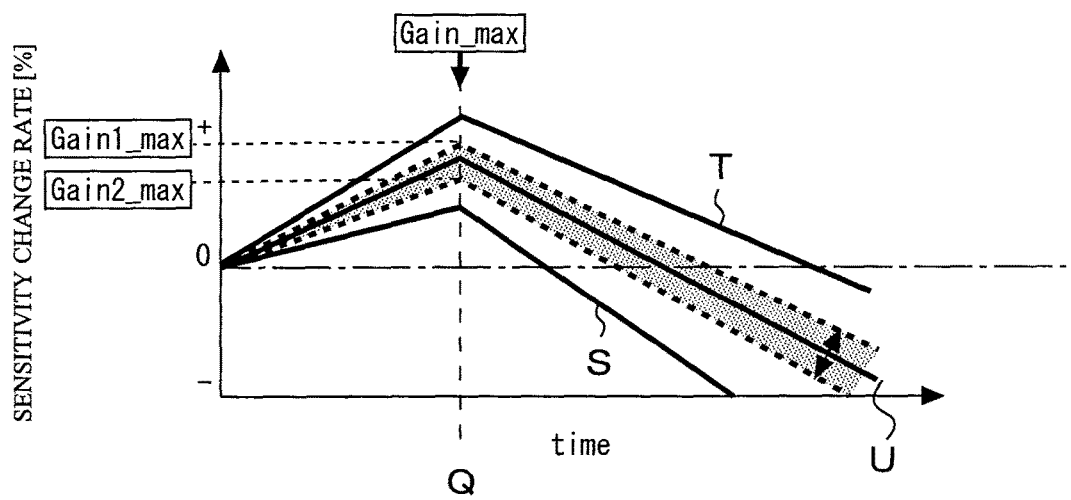
FIG. 7 is a view in which the kinds of sensitivity changes caused by the cylinder pressure sensor due to the adherence of deposits are represented with respect to the passage of time according to a second embodiment.
Figure 8:
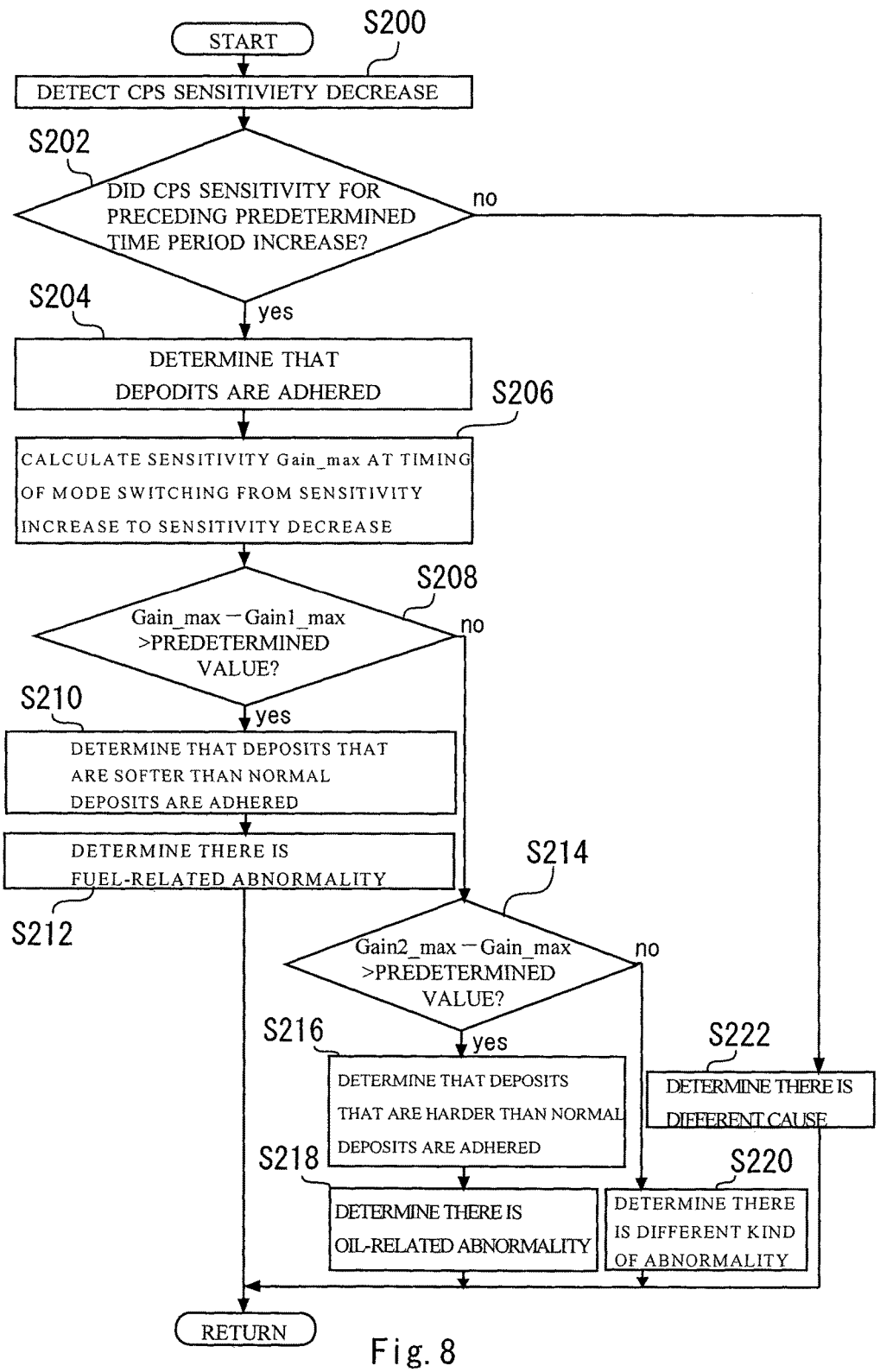
FIG. 8 is a flowchart of a deposit property determination routine executed by the ECU in the second embodiment.

Next, a second embodiment of the present invention will be described referring to FIG. 7 and FIG. 8. The second embodiment has the same system configuration as the first embodiment, and in the second embodiment the size of a sensitivity change rate at a time point at which a change in the sensitivity of the cylinder pressure sensor 20 switched from a sensitivity increase to a sensitivity decrease is compared with a reference value that is previously set in the ECU 100. A feature of the second embodiment is that the properties of adhered deposits are determined based on the comparison result. In FIG. 7 and FIG. 8, elements that are common with elements of the first embodiment are denoted by like reference characters, and a description of such elements is omitted hereunder.

FIG. 7 is a view in which the kinds of sensitivity changes caused by the cylinder pressure sensor 20 due to the adherence of deposits are represented with respect to the passage of time according to the second embodiment. Three kinds of solid lines that are denoted by reference characters S, T, and U, respectively, are shown in FIG. 7. These solid lines represent changes in the sensitivity of the cylinder pressure sensor 20 in a case where deposits have adhered thereto. There are variations in magnitude among these solid lines with respect to changes over time in the sensitivity change rate. This is because there are differences in the hardness of deposits that adhere to the cylinder pressure sensor 20. Therefore, it is possible to ascertain the hardness of the adhered deposits based on the magnitude of the sensitivity change rate. As a result, the cause of the occurrence of deposits can be estimated.

According to the second embodiment, a first reference value Gain1_max and a second reference value Gain 2_max are set in advance in the ECU 100 for comparing the magnitude of the sensitivity change rate. In FIG. 7, the first and second reference values are indicated by dashed lines. Hereunder, an example of determining the hardness of deposits using the first and second reference values will be described using the solid lines S, T and U.

First, the case with respect to the solid line S will be described. As shown in FIG. 7, the sensitivity change rate in the case of the solid line S is less than the second reference value Gain2_max at a time point Q. In this case, it can be determined that hard deposits are adhered to the cylinder pressure sensor 20. The occurrence of hard deposits is due to engine oil. It is thus found that the consumed amount of oil in the combustion chamber 18 is large. As a result, it can be estimated that a malfunction has occurred in the oil system such as a piston ring or a stem oil seal.

Next, the case with respect to the solid line T will be described. As shown in FIG. 7, the sensitivity change rate in the case of the solid line T is greater than the first reference value Gain1_max at the time point Q. In this case, it can be determined that soft deposits are adhered to the cylinder pressure sensor 20. The occurrence of soft deposits is due to fuel. It is thus found that the consumed amount of fuel in the combustion chamber 18 is large. As a result, it can be estimated that a malfunction has occurred in the fuel system such as an injector or a fuel pump.

Next, the case with respect to the solid line U will be described. As shown in FIG. 7, the sensitivity change rate in the case of the solid line U is between the first reference value Gain 1_max and the second reference value Gain 2_max at the time point Q. In this case it can be determined that the deposits adhering to the cylinder pressure sensor 20 are due to a factor other than engine oil and fuel (another abnormality).

[Deposit Property Determination Routine]

FIG. 8 is a flowchart of a deposit property determination routine that is executed by the ECU 100 according to the second embodiment. Note that, S200, S202, S204 and S222 in FIG. 8 correspond to S100, S102, S104 and S108 in the deposit adherence determination routine illustrated in FIG. 6 that was described above in the first embodiment, and hence a description of those steps is omitted hereunder.

If the ECU 100 determines in S204 that deposits are adhered, next, the ECU 100 calculates a sensitivity change rate Gain_max at a mode switching timing that is the timing of a switch from a sensitivity increase to a sensitivity decrease (S206). This means that the ECU 100 calculates the sensitivity change rate at the time point Q in FIG. 7.

Next, the ECU 100 determines whether or not a difference between the sensitivity change rate Gain_max calculated in S206 and a first reference value Gain1_max is greater than a predetermined value (S208).

If the ECU 100 determined in S208 that the difference between the sensitivity change rate Gain_max and the first reference value Gain1_max is greater than the predetermined value, next, the ECU 100 determines that deposits that are softer than normal deposits are adhered (S210). Next, the ECU 100 determines that there is a fuel-related abnormality (S212). Thereafter, the present routine is repeated.

On the other hand, if the ECU 100 determined in S208 that the difference between the sensitivity change rate Gain_max and the first reference value Gain1_max is less than or equal to the predetermined value, the ECU 100 determines whether or not a difference between the second reference value Gain2_max and the sensitivity change rate Gain_max calculated in S206 is greater than a predetermined value (S214).

If the ECU 100 determined in S214 that the difference between the second reference value Gain2_max and the sensitivity change rate Gain_max calculated in S206 is greater than the predetermined value, the ECU 100 then determines that deposits that are harder than normal deposits are adhered (S216). Next, the ECU 100 determines that there is an oil-related abnormality (S218). Thereafter, the present routine is repeated.

On the other hand, if the ECU 100 determined in S214 that the difference between the second reference value Gain2_max and the sensitivity change rate Gain_max calculated in S206 is less than or equal to the predetermined value, the ECU 100 determines that there is a different kind of abnormality (S220). Thereafter, the present routine is repeated.

Note that, in S208 and S214 of the above described routine, although a difference between the respective reference values and a calculated sensitivity change rate is compared with a predetermined value, the present embodiment is not limited thereto. For example, in S208 the ECU 100 may determine that soft deposits are adhered in a case where the calculated sensitivity change rate is greater than the first reference value Gain1_max. Further, in S214 the ECU 100 may determine that hard deposits are adhered in a case where the calculated sensitivity change rate is less than the second reference value Gain2_max.

Note that "deposit property determination means" according to the second invention is realized by the ECU 100 executing the above described S206, S208, S210, S212, S214, S216, S218 and S220.

Third Embodiment

Figure 9:
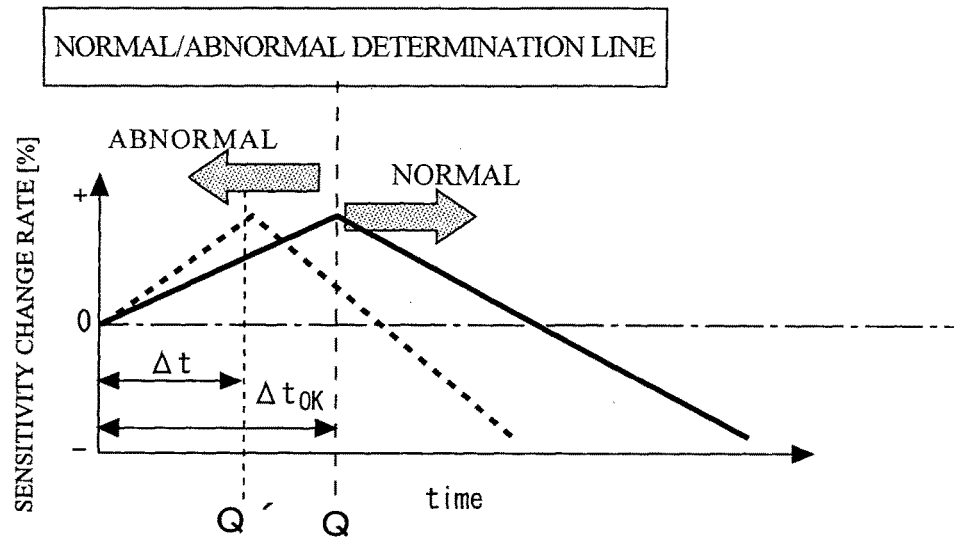
FIG. 9 is a view in which the kinds of sensitivity changes caused by the cylinder pressure sensor due to the adherence of deposits are represented with respect to the passage of time according to a third embodiment.
Figure 10:
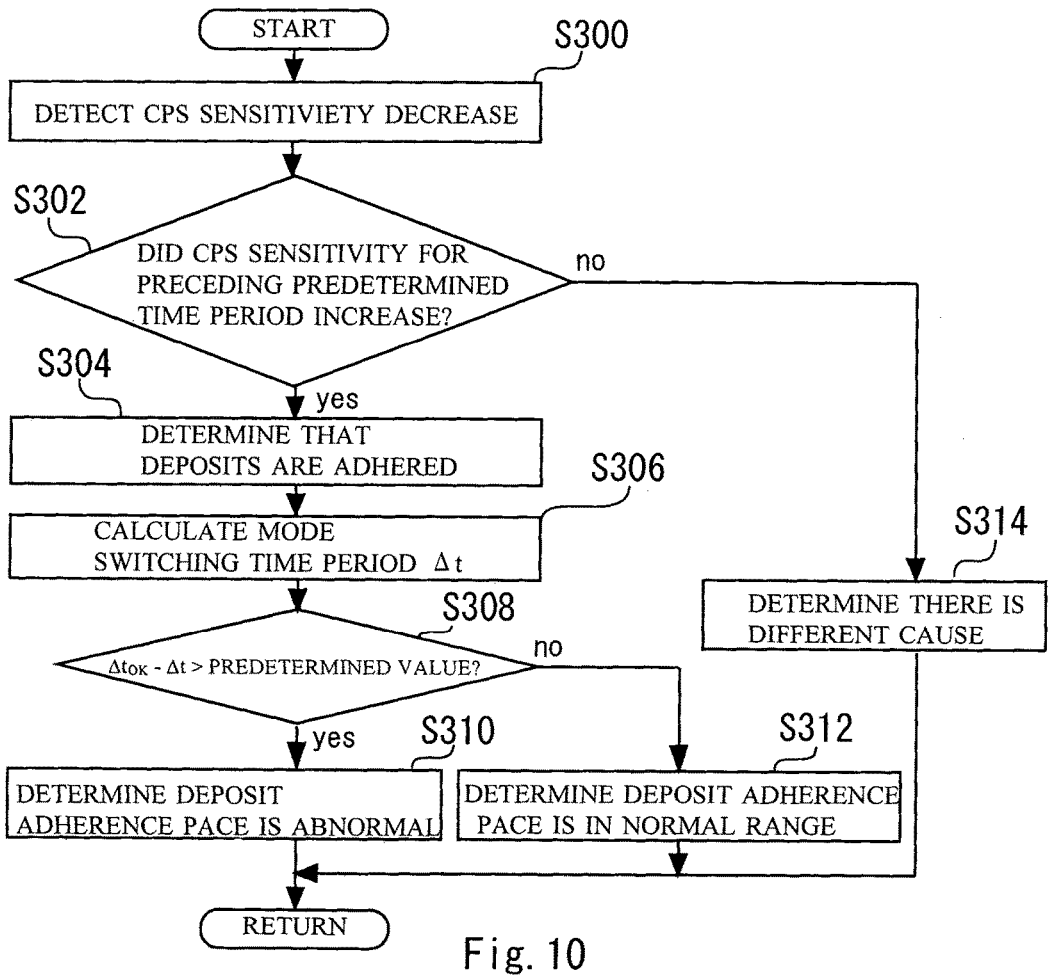
FIG. 10 is a flowchart of a deposit adherence pace determination routine executed by the ECU in the third embodiment.

Next, a third embodiment of the present invention will be described referring to FIG. 9 and FIG. 10. The third embodiment has the same system configuration as the first embodiment, and in the third embodiment a time period (hereunder referred to as "mode switching time period $\Delta t$") from a time point at which a change in the sensitivity of the cylinder pressure sensor 20 starts to be a sensitivity increase until a time point at which the change in the sensitivity of the cylinder pressure sensor 20 switches from the sensitivity increase to a sensitivity decrease is compared with a reference time period $\Delta t_{OK}$ that is previously set in the ECU 100. A feature of the third embodiment is that the pace of adherence of deposits is determined based on the comparison result. In FIG. 9 and FIG. 10, elements that are common with elements of the first embodiment are denoted by like reference characters, and a description of such elements is omitted hereunder.

FIG. 9 is a view in which the kinds of sensitivity changes caused by the cylinder pressure sensor 20 due to the adherence of deposits are represented with respect to the passage of time according to the third embodiment. A single solid line and a single dashed line are shown in FIG. 9. These lines represent changes in the sensitivity of the cylinder pressure sensor 20 in a case where deposits have adhered thereto.

Further, a reference time period $\Delta t_{OK}$ for determining the pace of adherence of deposits is shown in FIG. 9. In FIG. 9, the reference time period $\Delta t_{OK}$ represents a time period from a time point at which a change in the sensitivity of the cylinder pressure sensor 20 starts to be a sensitivity increase until a time point Q. According to the third embodiment, it is determined that the pace of adherence of deposits is abnormal if the mode switching time period $\Delta t$ is shorter than the reference time period $\Delta t_{OK}$.

For example, the mode switching time period $\Delta t$ indicated by a dashed line shown in FIG. 9 is a time period from a time point at which a change in the sensitivity of the cylinder pressure sensor 20 starts to be a sensitivity increase until a time point Q' at which the change in the sensitivity of the cylinder pressure sensor 20 switches from the sensitivity increase to a sensitivity decrease. As shown in FIG. 9, the mode switching time period $\Delta t$ indicated by the dashed line is a shorter time period than the reference time period $\Delta t_{OK}$. Consequently, in a case where the sensitivity change of the cylinder pressure sensor 20 that is illustrated by the dashed line in FIG. 9 is detected, the ECU 100 determines that the pace of adherence of deposits is abnormal. It can thereby be ascertained that the pace of adherence of deposits is relatively faster than at a normal time.

[Deposit Adherence Pace Determination Routine]

FIG. 10 is a flowchart of a deposit adherence pace determination routine that is executed by the ECU 100 according to the third embodiment. Note that, S300, S302, S304 and S314 in FIG. 10 correspond to S100, S102, S104 and S108 in the deposit adherence determination routine illustrated in FIG. 6 that was described above in the first embodiment, and hence a description of those steps is omitted hereunder.

If the ECU 100 determines in S304 that deposits are adhered, next, the ECU 100 calculates the mode switching time period $\Delta t$ (S306).

The ECU 100 then determines whether or not a difference between the reference time period $\Delta t_{OK}$ and the mode switching time period $\Delta t$ is greater than a predetermined value (S308).

Next, if the ECU 100 determined in S308 that the difference between the reference time period $\Delta t_{OK}$ and the mode switching time period $\Delta t$ is greater than the predetermined value, the ECU 100 determines that the deposit adherence pace is abnormal (S310).

On the other hand, if the ECU 100 determined in S308 that the difference between the reference time period $\Delta t_{OK}$ and the mode switching time period $\Delta t$ is less than or equal to the predetermined value, the ECU 100 determines that the deposit adherence pace is in a normal range (S312).

Note that, in S308 of the above described routine, although a difference between the reference time period $\Delta t_{OK}$ and the mode switching time period $\Delta t$ is compared with a predetermined value, the present embodiment is not limited thereto. For example, in S308, the ECU 100 may determine that the pace of adherence of deposits is abnormal if the mode switching time period $\Delta t$ is shorter than the reference time period $\Delta t_{OK}$.

Note that "deposit adherence pace determination means" according to the third invention is realized by the ECU 100 executing the above described S306, S308, S310 and S312.

Further, although a time period is used as a criterion for determining the pace of adherence of deposits in the third embodiment, the third embodiment is not limited thereto. For example, a parameter such as a traveled distance, an operating time period, or a total number of revolutions may be used instead of a time period.

REFERENCE SIGNS LIST

10 Engine
16 Crank angle sensor
18 Combustion chamber
20 Cylinder pressure sensor (CPS)
34 Air flow sensor
52 Pressure-receiving portion
54 Sensing portion
100 ECU

The invention claimed is:

1. A control device for an internal combustion engine equipped with a cylinder pressure sensor in an engine head, wherein the cylinder pressure sensor has an upper face being subjected to cylinder pressure from an axial direction and a side face being subjected to cylinder pressure from a radial direction, the control device comprising:
    detection means for detecting a change in a sensitivity of the cylinder pressure sensor;
    deposit adherence determination means for determining that deposits are adhered between the side face and the engine head, and adhered to the upper face thereafter in a case where a decrease in the sensitivity of the cylinder pressure sensor is detected after an increase in the sensitivity of the cylinder pressure sensor is detected; and
    deposit detachment means for executing control that detaches deposits in a case where the control device determines that deposits are adhered between the side face and the engine head, and adhered to the upper face thereafter.

2. The control device for an internal combustion engine according to claim 1, further comprising:
    sensitivity change rate calculation means for calculating a rate of change relative to an initial state of the sensitivity of the cylinder pressure sensor; and
    deposit property determination means for determining that adhered deposits are soft in a case where the rate of change at a time point at which the change in the sensitivity of the cylinder pressure sensor switches from a sensitivity increase to a sensitivity decrease is greater than a first reference value, and determining that adhered deposits are hard in a case where the rate of change at a time point at which the change in the sensitivity of the cylinder pressure sensor switches from a sensitivity increase to a sensitivity decrease is less than a second reference value that is less than the first reference value.

3. The control device for an internal combustion engine according to claim 1, further comprising:
    deposit adherence pace determination means for determining that a pace of adherence of deposits is abnormal in a case where a time period from a time point at which the change in the sensitivity of the cylinder pressure sensor starts to be a sensitivity increase until a time point at which the change in the sensitivity of the cylinder pressure sensor switches from the sensitivity increase to a sensitivity decrease is shorter than a reference time period.

4. A control device for an internal combustion engine equipped with a cylinder pressure sensor in an engine head, wherein the cylinder pressure sensor has an upper face being subjected to cylinder pressure from an axial direction and a side face being subjected to cylinder pressure from a radial direction, the control device configured to:
- detect a change in a sensitivity of the cylinder pressure sensor;
- determine that deposits are adhered between the side face and the engine head, and adhered to the upper face thereafter in a case where a decrease in the sensitivity of the cylinder pressure sensor is detected after an increase in the sensitivity of the cylinder pressure sensor is detected; and
- execute control that detaches deposits in a case where the control device determines that deposits are adhered between the side face and the engine head, and adhered to the upper face thereafter.

5. The control device for an internal combustion engine according to claim 4, wherein the control device is further configured to calculate a rate of change relative to an initial state of the sensitivity of the cylinder pressure sensor, to determine that adhered deposits are soft in a case where the rate of change at a time point at which the change in the sensitivity of the cylinder pressure sensor switches from a sensitivity increase to a sensitivity decrease is greater than a first reference value, and to determine that adhered deposits are hard in a case where the rate of change at a time point at which the change in the sensitivity of the cylinder pressure sensor switches from a sensitivity increase to a sensitivity decrease is less than a second reference value that is less than the first reference value.

6. The control device for an internal combustion engine according to claim 4, wherein the control device is further configured to determine that a pace of adherence of deposits is abnormal in a case where a time period from a time point at which the change in the sensitivity of the cylinder pressure sensor starts to be a sensitivity increase until a time point at which the change in the sensitivity of the cylinder pressure sensor switches from the sensitivity increase to a sensitivity decrease is shorter than a reference time period.

* * * * *